(12) United States Patent
Lim

(10) Patent No.: US 11,371,553 B2
(45) Date of Patent: Jun. 28, 2022

(54) MODULE BEARING AND POWER TRANSMISSION DEVICE INCLUDING SAME

(71) Applicant: SEJIN-IGB CO., LTD., Asan-si (KR)

(72) Inventor: Sun Ho Lim, Asan-si (KR)

(73) Assignee: SEJIN-IGB CO., LTD., Asan-si (KR)

( * ) Notice: Subject to any disclaimer, the term of this patent is extended or adjusted under 35 U.S.C. 154(b) by 837 days.

(21) Appl. No.: 16/316,549

(22) PCT Filed: May 18, 2017

(86) PCT No.: PCT/KR2017/005185
§ 371 (c)(1),
(2) Date: Jan. 9, 2019

(87) PCT Pub. No.: WO2018/012725
PCT Pub. Date: Jan. 18, 2018

(65) Prior Publication Data
US 2019/0301524 A1    Oct. 3, 2019

(30) Foreign Application Priority Data

Jul. 13, 2016   (KR) ........................ 10-2016-0088376

(51) Int. Cl.
*F16H 1/06* (2006.01)
*F16H 1/20* (2006.01)
(Continued)

(52) U.S. Cl.
CPC ............ *F16C 19/08* (2013.01); *F16C 19/183* (2013.01); *F16C 19/362* (2013.01);
(Continued)

(58) Field of Classification Search
CPC ......... F16H 19/04; F16H 55/10; F16C 13/006
(Continued)

(56) References Cited

U.S. PATENT DOCUMENTS 3,606,725 A    9/1971  Dugan
4,404,876 A    9/1983  Eckel
(Continued)

FOREIGN PATENT DOCUMENTS

EP    0274682 A2    7/1998
EP    3196490 A1    7/2017
(Continued)

OTHER PUBLICATIONS

Supplementary Search Report, dated Jun. 7, 2019 for European patent application 17827799.2.
(Continued)

*Primary Examiner* — Jake Cook
(74) *Attorney, Agent, or Firm* — Vorys, Sater, Seymour and Pease LLP

(57) ABSTRACT

A module bearing and a power transmission device including the module bearing. A module bearing includes a module outer wheel supported by and in contact with a side wall of a gear to guide rotational or linear motion of the gear, a bearing rotor rotatably disposed radially inward of the module outer wheel, and a part-assembly type module inner wheel disposed radially inward of the module outer wheel with the bearing rotor interposed therebetween and connected to the bearing rotor, in which a plurality of separate parts are manufactured and assembled into the part-assembly type module inner wheel to apply a preload to the bearing rotor.

19 Claims, 17 Drawing Sheets

(51) Int. Cl.

| | |
|---|---|
| *F16C 19/08* | (2006.01) |
| *F16C 19/36* | (2006.01) |
| *F16C 19/54* | (2006.01) |
| *F16C 29/00* | (2006.01) |
| *F16C 29/04* | (2006.01) |
| *F16H 1/10* | (2006.01) |
| *F16H 19/04* | (2006.01) |
| *F16H 55/10* | (2006.01) |
| *F16C 25/06* | (2006.01) |
| *F16C 19/18* | (2006.01) |
| *F16C 19/50* | (2006.01) |
| *F16C 19/16* | (2006.01) |
| *F03D 7/02* | (2006.01) |
| *F03D 80/70* | (2016.01) |

(52) U.S. Cl.
CPC .......... *F16C 19/507* (2013.01); *F16C 19/547* (2013.01); *F16C 25/06* (2013.01); *F16C 29/001* (2013.01); *F16C 29/008* (2013.01); *F16C 29/045* (2013.01); *F16H 1/06* (2013.01); *F16H 1/10* (2013.01); *F16H 19/04* (2013.01); *F16H 55/10* (2013.01); *F03D 7/0204* (2013.01); *F03D 80/70* (2016.05); *F16C 19/166* (2013.01); *F16C 2226/60* (2013.01); *F16C 2361/61* (2013.01)

(58) Field of Classification Search
USPC .................................................. 74/422, 465
See application file for complete search history.

(56) References Cited

U.S. PATENT DOCUMENTS

| | | | | |
|---|---|---|---|---|
| 4,739,685 | A * | 4/1988 | Ricci .................... | B23Q 9/0021 82/113 |
| 4,958,943 | A * | 9/1990 | Nakanishi ............... | F16C 33/60 384/488 |
| 5,288,151 | A | 2/1994 | Isert et al. | |
| 5,368,399 | A | 11/1994 | Tremblay | |
| 5,549,024 | A * | 8/1996 | Ricci ......................... | B23B 3/26 82/101 |
| 7,350,270 | B2 * | 4/2008 | Fournier ................. | F16C 29/12 16/91 |
| 8,584,557 | B2 * | 11/2013 | Hall .......................... | B23B 3/26 82/131 |
| 2013/0186213 | A1 * | 7/2013 | Lim ........................ | F16H 19/04 74/31 |
| 2017/0254359 | A1 | 9/2017 | Maiwa et al. | |

FOREIGN PATENT DOCUMENTS

| | | |
|---|---|---|
| JP | 3606725 B2 | 1/2005 |
| JP | 2010533830 A | 10/2010 |
| JP | 2016061317 A | 4/2016 |
| KR | 100957033 B1 | 5/2010 |
| KR | 20130117489 A | 10/2013 |
| KR | 101480986 B1 | 1/2015 |

OTHER PUBLICATIONS

International Search Report and Written Opinion dated Aug. 10, 2017 for PCT/KR2017/005185 to Sejin-IGB Co., Ltd. filed May 18, 2017.

* cited by examiner

MODULE BEARING AND POWER TRANSMISSION DEVICE INCLUDING SAME

This is a US National stage of PCT patent application no. PCT/KR2017/005185, having an international filing date of May 18, 2017, which claims the benefit of Korean patent application no. 10-2016-0088376, filed Jul. 13, 2016, hereby incorporated by reference in its entirety.

TECHNICAL FIELD

The present inventive concept relates to a module bearing and a power transmission device including the same, and more particularly, to a module bearing which is applicable to equipment without limitation of the size of a ring gear, may remarkably reduce installation costs by selectively using only a necessary number of module bearings according to a load demanded by a process, may enable thin and light implementation in an axial direction due to a compact structure, and, when a linear gear or a curved gear is used, may smoothly guide linear motion and curved motion of the gear due to an efficient structure, and a power transmission device including the same.

BACKGROUND ART

Power transmission devices may be applied to various industrial equipment including semiconductor equipment or flat panel display equipment such as LCDs, PDPs, or OLEDs, to implement linear or curved motion. In other words, the power transmission device may implement a linear or curved motion according to interaction between a rack and a pinion, based on rotation power of a motor.

For example, when the rack is a linear type, a moving object may perform linear motion in interaction with the pinion, and when the rack is a curved type, the moving object may perform curved motion in interaction with the pinion.

Accordingly, based on the above structures and functions, the linear, curved, or rotational movements of various industrial equipment like an index may be implemented by appropriately combining the rack and the pinion.

In order to implement the linear, curved, or rotational movements of various industrial equipment, for example, an index, a combination of a ring gear 10 and a cross roller bearing 20 as illustrated in FIG. 1 may be employed.

FIG. 1 illustrates a state in which a general ring gear and a cross roller bearing are assembled. FIG. 2 is a side view of FIG. 1. For reference, in FIG. 1, a 4-point contact bearing may be used instead of the cross roller bearing 20.

In FIG. 1, the ring gear 10 denotes a gear having a disc shape without a boss or an arm as in a reduction gear of an automobile. A tooth profile 11 may be formed on an outer surface of the ring gear 10.

The cross roller bearing 20, which is referred to as a cross rollering, may denote a bearing including an inner ring, an outer ring, rolling elements, and a plastic spacer. The cross roller bearing 20 may be coupled to a surrounding structure, for example, an index, and may smoothly transfer a rotational motion of the ring gear 10 to an index table.

The cross roller bearing 20 may support, due to its structural characteristics, a load in both directions of an axial direction and a radial direction, a tilting moment load, and all loads at a single bearing position. In particular, the cross roller bearing 20 has been known to be generally applied to industrial equipment like an index in the form illustrated in FIG. 1 due to its high rigidity and high operational accuracy.

As described above, a structure of transferring a rotational force of the ring gear 10 to, for example, an index, through the structure of FIGS. 1 and 2, is a most frequent bearing structure.

However, in the related art illustrated in FIGS. 1 and 2, due to a structural limitation thereof, as installation costs sharply increase according to the size (diameter) of the ring gear 10, various problems may be generated, for example, the application to equipment may be substantially difficult or the diameter of the ring gear 10 may be restricted.

First, as the diameter of the cross roller bearing 20 increases, the price of the cross roller bearing 20 sharply increases so that the equipment application thereof may be substantially difficult. Actually, the cross roller bearing 20 is an expensive bearing, and thus a unit price thereof may increase as the size thereof increases.

Second, since there is a limitation in the manufacturing size of the cross roller bearing 20, the diameter of the ring gear 10 may be limited according to the size of the cross roller bearing 20. In other words, it may be fundamentally impossible to employ the ring gear 10 having a diameter by far greater than the maximum diameter of the cross roller bearing 20.

Third, the cross roller bearing 20 may unavoidably protrude from one side of the ring gear 10 as illustrated in FIG. 1. Accordingly, thin and light implement in an axial direction may be difficult due to the coupling structure of the cross roller bearing 20. In other words, since an overall height H1 is increased as illustrated in FIG. 2, due to the cross roller bearing 20, thin and light implementation in an axial direction may be difficult.

As described above, although the cross roller bearing 20 is a general bearing providing many merits as described above, the cross roller bearing 20 has various other demerits. Considering the above matters, there is a demand for a new concept bearing structure out of a conventional typical method employing the cross roller bearing 20 or the 4-point contact bearing only.

DETAILED DESCRIPTION OF THE INVENTIVE CONCEPT

Technical Problem

The present inventive concept provides a module bearing and a power transmission device including the module bearing. The module bearing is applicable to equipment without limitation of the size of a ring gear, may remarkably reduce installation costs by selectively using only a necessary number of module bearings according to a load demanded by a process, may enable thin and light implementation in an axial direction due to a compact structure, and, when a linear gear or a curved gear is used, may smoothly guide linear motion and curved motion of the gear due to an efficient structure.

Advantageous Effects

According to the present inventive concept, the module bearing is applicable to equipment without limitation of the size of a ring gear, may remarkably reduce installation costs by selectively using only a necessary number of module bearings according to a load demanded by a process, may enable thin and light implementation in an axial direction due to a compact structure, and, when a linear gear or a curved gear is used, may smoothly guide linear motion and curved motion of the gear due to an efficient structure.

BEST MODE

Figure 1:
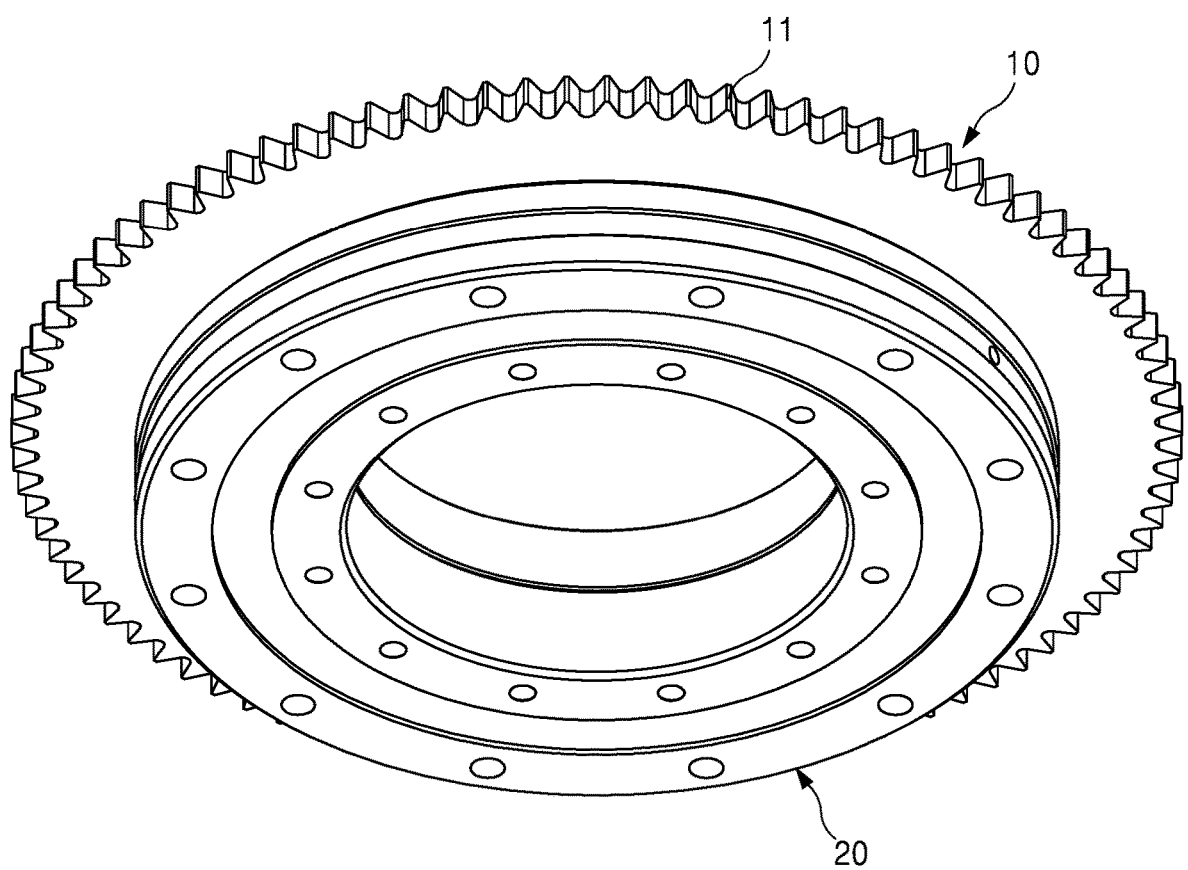
FIG. 1 illustrates a state in which a general ring gear and a cross roller bearing are assembled.

According to an aspect of the present inventive concept, a module bearing includes a module outer wheel supported by and in contact with a side wall of a gear to guide rotational or linear motion of the gear, a bearing rotor rotatably disposed radially inward of the module outer wheel, and a part-assembly type module inner wheel disposed radially inward of the module outer wheel with the bearing rotor interposed therebetween and connected to the bearing rotor, in which a plurality of separate parts are manufactured and assembled into the part-assembly type module inner wheel to apply a preload to the bearing rotor.

The part-assembly type module inner wheel may include a first inner wheel part having a first support wall supported by one end portion of the bearing rotor, and a second inner wheel part having a second support wall supported by the other end portion of the bearing rotor at an opposite side of the bearing rotor.

The first inner wheel part may include a first inner wheel insertion portion inserted into the bearing rotor, and a first inner wheel flange portion connected to the first inner wheel insertion portion, having a diameter greater than a diameter of the first inner wheel insertion portion, and forming the first support wall between the first inner wheel insertion portion and the first inner wheel flange portion.

The second inner wheel part may include a second inner wheel insertion portion inserted into the bearing rotor and surface-contacting an end portion of the first inner wheel insertion portion inside the bearing rotor, and a second inner wheel flange portion connected to the second inner wheel insertion portion, having a diameter greater than a diameter of the second inner wheel insertion portion, and forming the second support wall between the second inner wheel insertion portion and the second inner wheel flange portion.

The part-assembly type module inner wheel may further include first and second coupling bolt fastening bolt holes respectively formed in the first inner wheel part and the second inner wheel part for fastening of a coupling bolt to couple the first inner wheel part and the second inner wheel part.

The first and second coupling bolt fastening bolt hole may be disposed at a center area of the part-assembly type module inner wheel.

The part-assembly type module inner wheel may further include first and second preload bolt fastening bolt holes respectively formed in the first inner wheel part and the second inner wheel part for fastening of a preload bolt to apply a preload to the bearing rotor after the first inner wheel part and the second inner wheel part are coupled to each other.

A plurality of first and second preload bolt fastening bolt holes may be arranged in an equiangular interval along a circumferential direction of the part-assembly type module inner wheel.

The sizes of the first inner wheel part and the second inner wheel parts may be different from each other.

A guide slot in which a guide protruding portion of the gear is inserted and guided may be formed to be concave in an outer wall of the module outer wheel.

The guide slot may have a letter V shape.

The gear may include any one of a ring gear, a linear type gear, and a curved type gear.

According to another aspect of the present inventive concept, a power transmission device includes a gear having a tooth profile formed on one side thereof, a pinion engaged with the tooth profile of the gear to interact with each other, and a plurality of module bearings arranged spaced apart from each other at an opposite side of a side portion where the tooth profile of the gear is formed, and guiding rotational or linear motion of the gear during driving of the pinion.

Each of the plurality of module bearings may include a module outer wheel supported by and in contact with a side portion opposite to the side portion where the tooth profile of the gear is formed, a bearing rotor rotatably disposed radially inward of the module outer wheel, and a part-assembly type module inner wheel disposed radially inward of the module outer wheel with the bearing rotor interposed therebetween and connected to the bearing rotor, wherein a plurality of separate parts are manufactured and assembled into the part-assembly type module inner wheel to apply a preload to the bearing rotor.

The part-assembly type module inner wheel may include a first inner wheel part having a first support wall supported by one end portion of the bearing rotor, and a second inner wheel part having a second support wall supported by the other end portion of the bearing rotor at an opposite side of the bearing rotor.

The first inner wheel part may include a first inner wheel insertion portion inserted into the bearing rotor, and a first inner wheel flange portion connected to the first inner wheel insertion portion, having a diameter greater than a diameter of the first inner wheel insertion portion, and forming the first support wall between the first inner wheel insertion portion and the first inner wheel flange portion, and the second inner wheel part includes a second inner wheel insertion portion inserted into the bearing rotor and surface-contacting an end portion of the first inner wheel insertion portion inside the bearing rotor, and a second inner wheel flange portion connected to the second inner wheel insertion portion, having a diameter greater than a diameter of the second inner wheel insertion portion, and forming the second support wall between the second inner wheel insertion portion and the second inner wheel flange portion.

The part-assembly type module inner wheel may further include first and second coupling bolt fastening bolt holes respectively formed in the first inner wheel part and the second inner wheel part for fastening of a coupling bolt to couple the first inner wheel part and the second inner wheel part.

The part-assembly type module inner wheel may further include first and second preload bolt fastening bolt holes respectively formed in the first inner wheel part and the second inner wheel part for fastening of a preload bolt to apply a preload to the bearing rotor after the first inner wheel part and the second inner wheel part are coupled to each other.

The pinion may include a plurality of power transmission pins having a circular arrangement structure and engaged with the tooth profile of the gear, and a pin rotation support portion rotatably supporting the plurality of power transmission pins.

The power transmission device may further include an external coupling type motor portion connected to the pin rotation support portion and generating rotation power to rotate the pin rotation support portion.

The power transmission device may further include an outer motor portion arranged radially inward of the pin rotation support portion and connected to the pin rotation support portion, and generating rotation power to rotate the pin rotation support portion.

The gear may include any one of a ring gear, a linear type gear, and a curved type gear.

MODE OF THE INVENTIVE CONCEPT

The attached drawings for illustrating preferred embodiments of the present inventive concept are referred to in order to gain a sufficient understanding of the present inventive concept, the merits thereof, and the objectives accomplished by the implementation of the present inventive concept.

Hereinafter, the present inventive concept will be described in detail by explaining preferred embodiments of the inventive concept with reference to the attached drawings. Like reference numerals in the drawings denote like elements.

Figure 3:
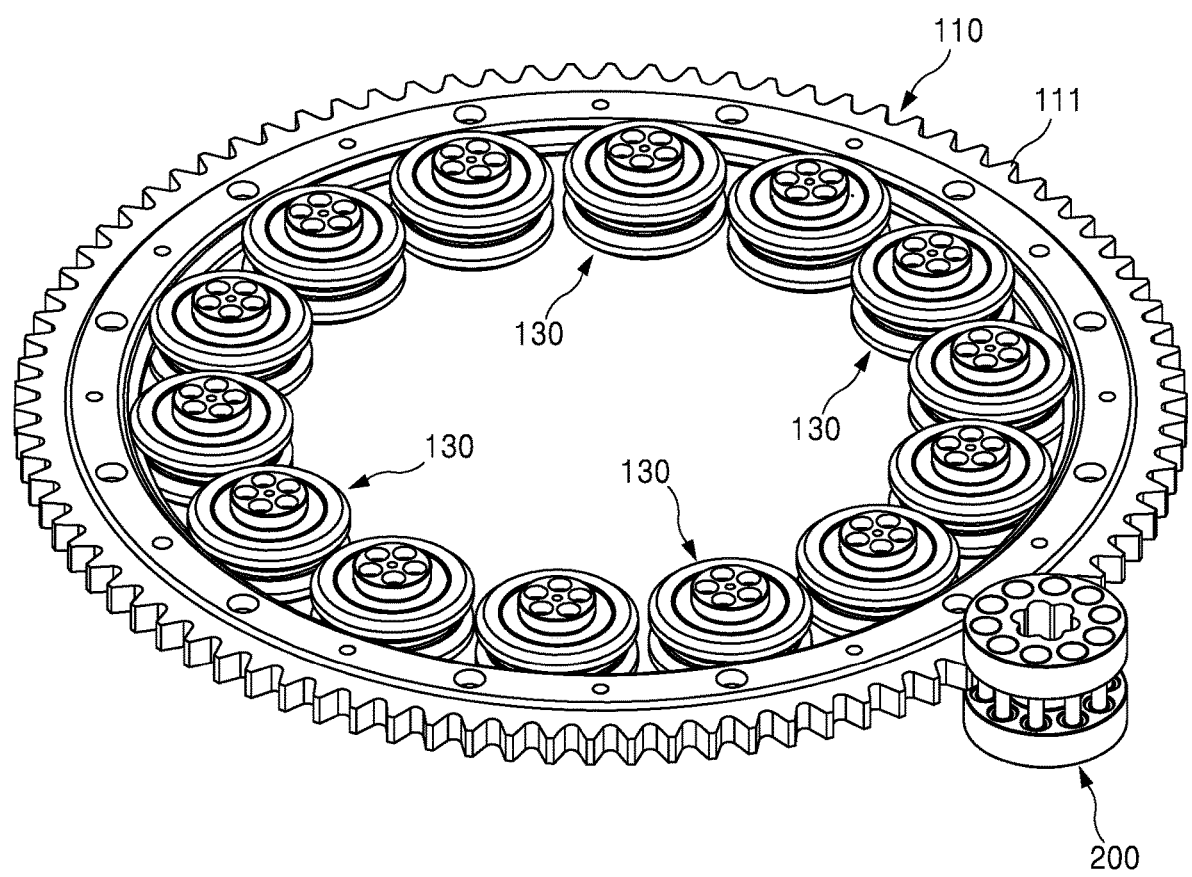
FIG. 3 is a perspective view of a power transmission device employing a module bearing, according to an embodiment of the present inventive concept.
Figure 4:
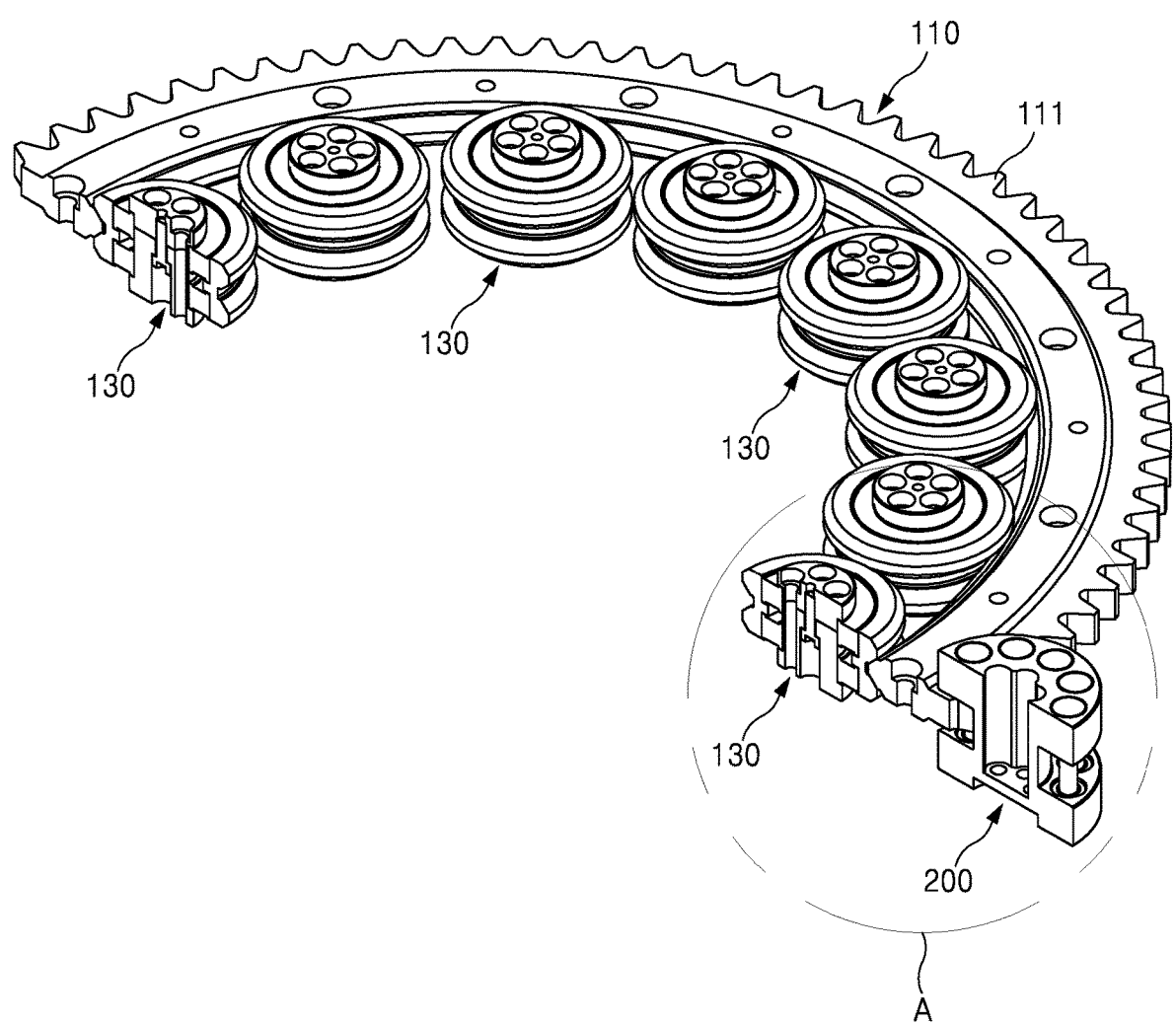
FIG. 4 is a partially cut-away perspective view of a major portion of FIG. 3.
Figure 5:
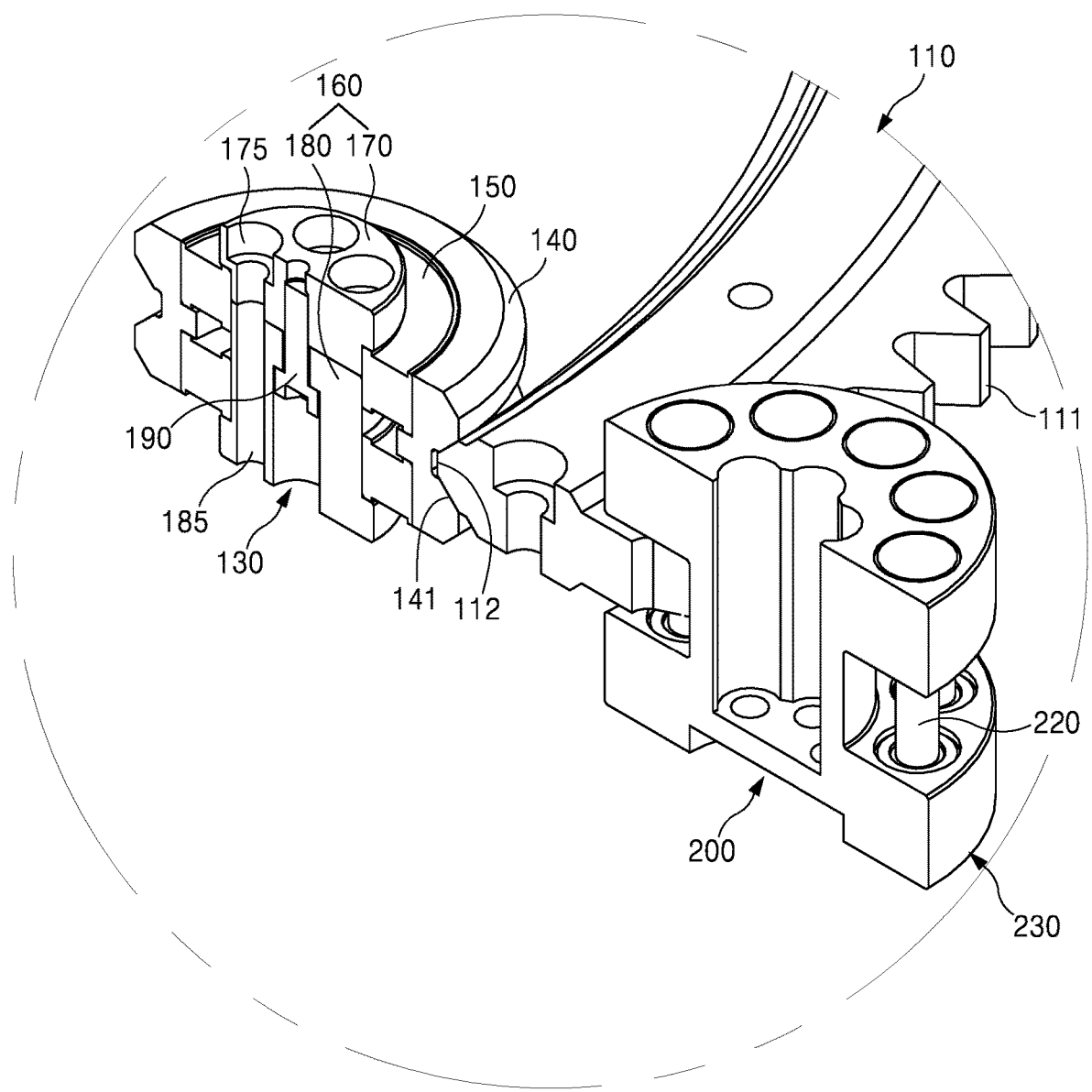
FIG. 5 is an enlarged view of an area A of FIG. 4.
Figure 6:
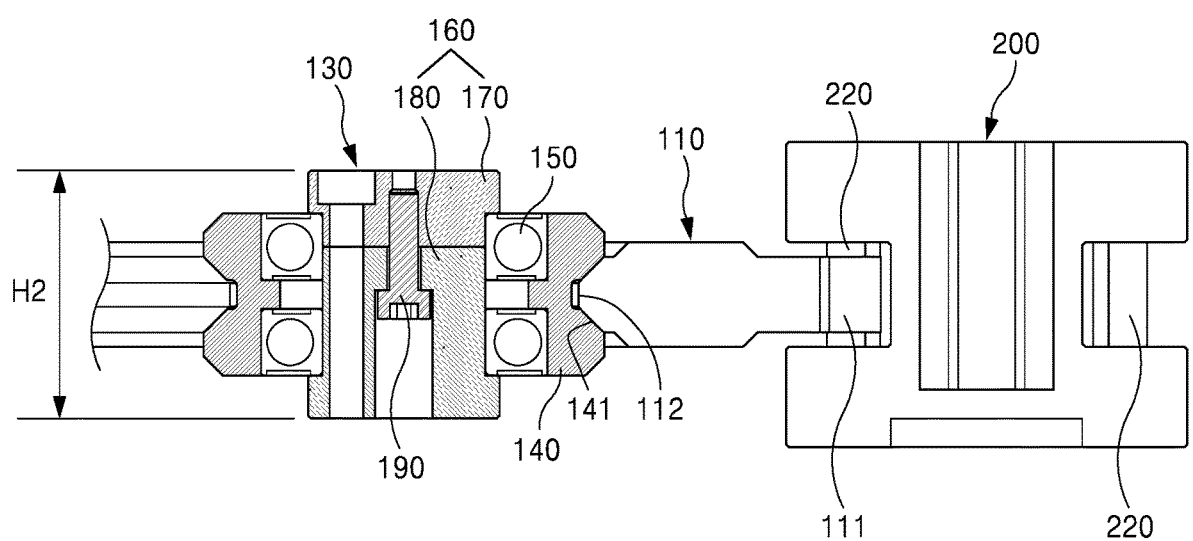
FIG. 6 is a partially cross-sectional view of FIG. 5.
Figure 7:
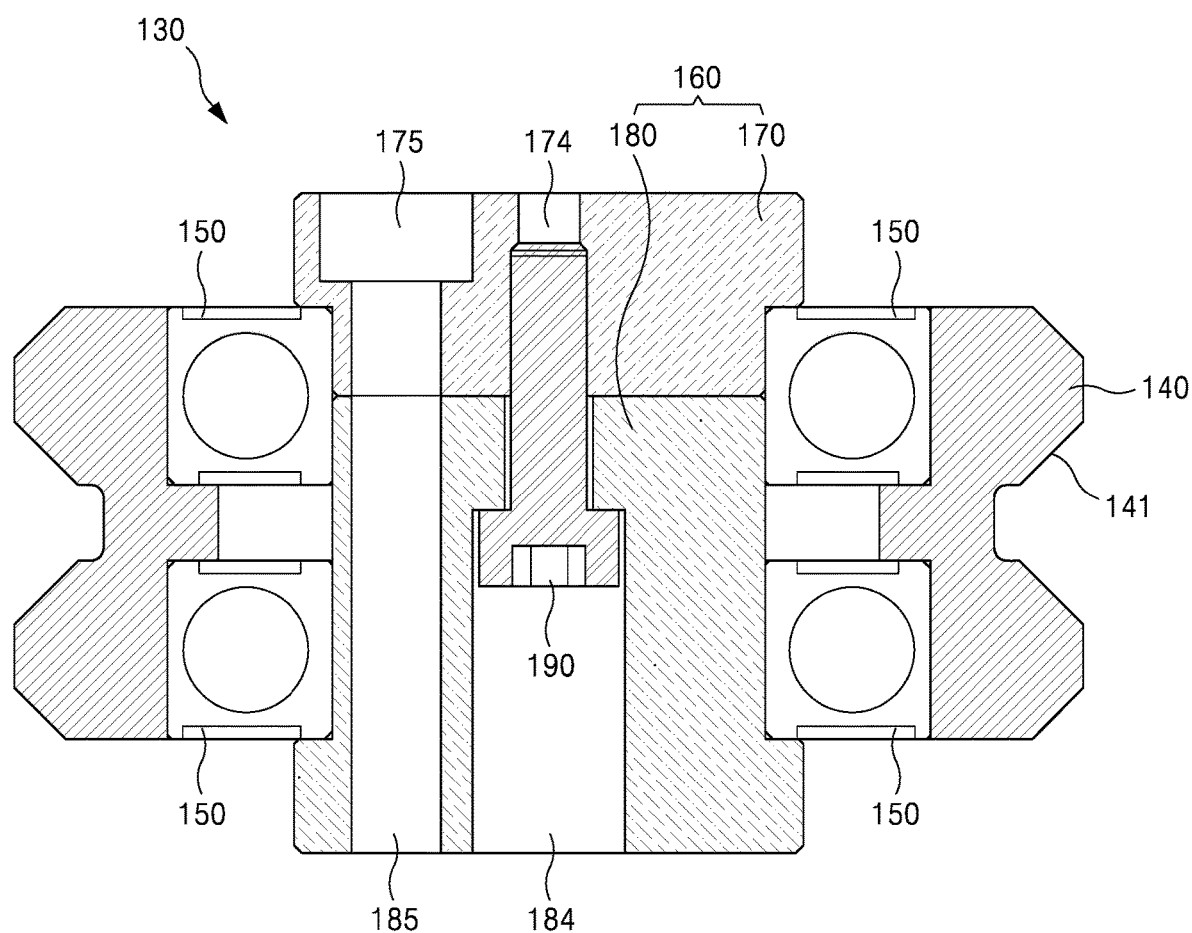
FIG. 7 is an enlarged view of a module bearing of FIG. 6.
Figure 8:
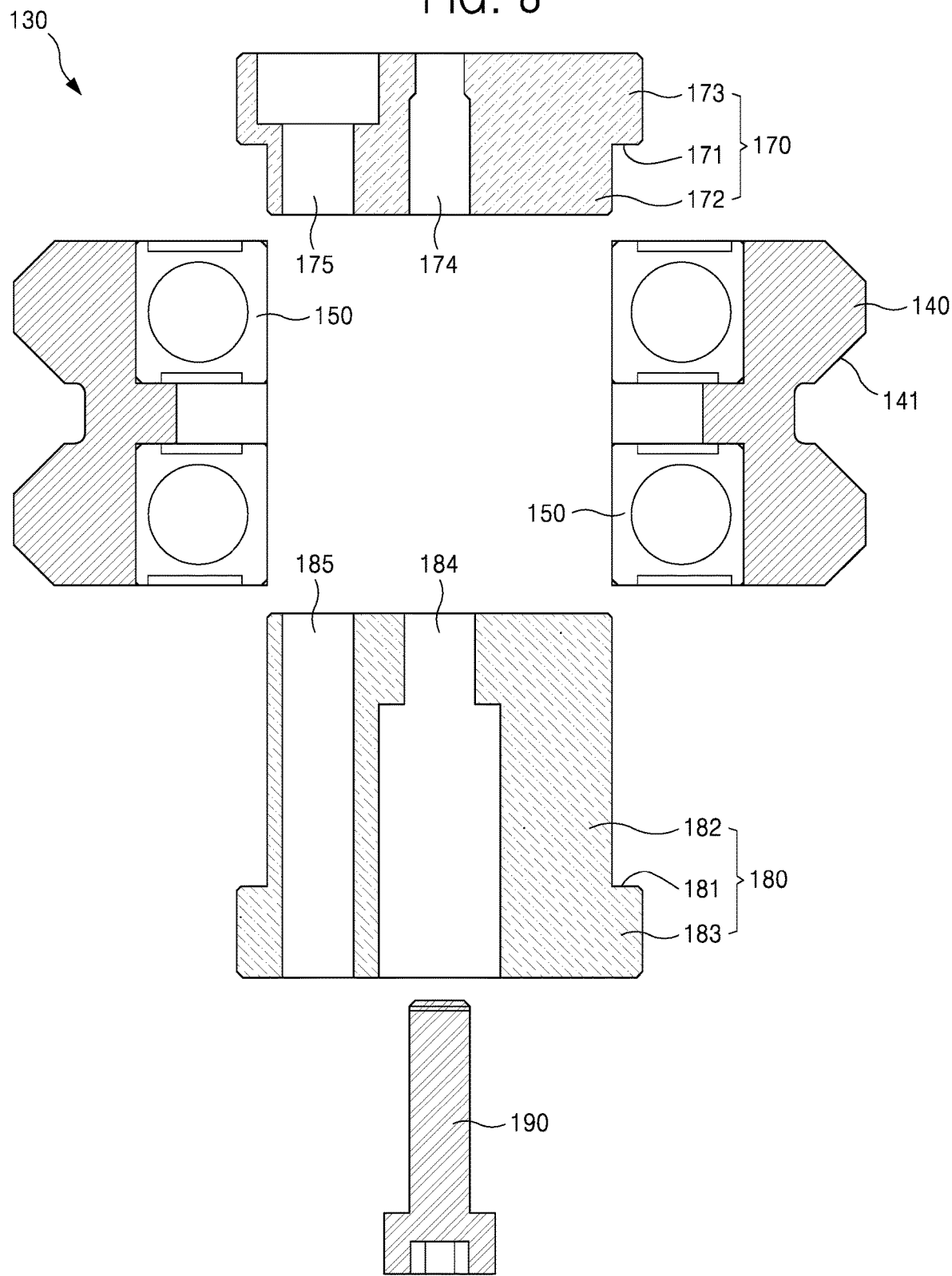
FIG. 8 is a partially exploded view of FIG. 7.
Figure 9:
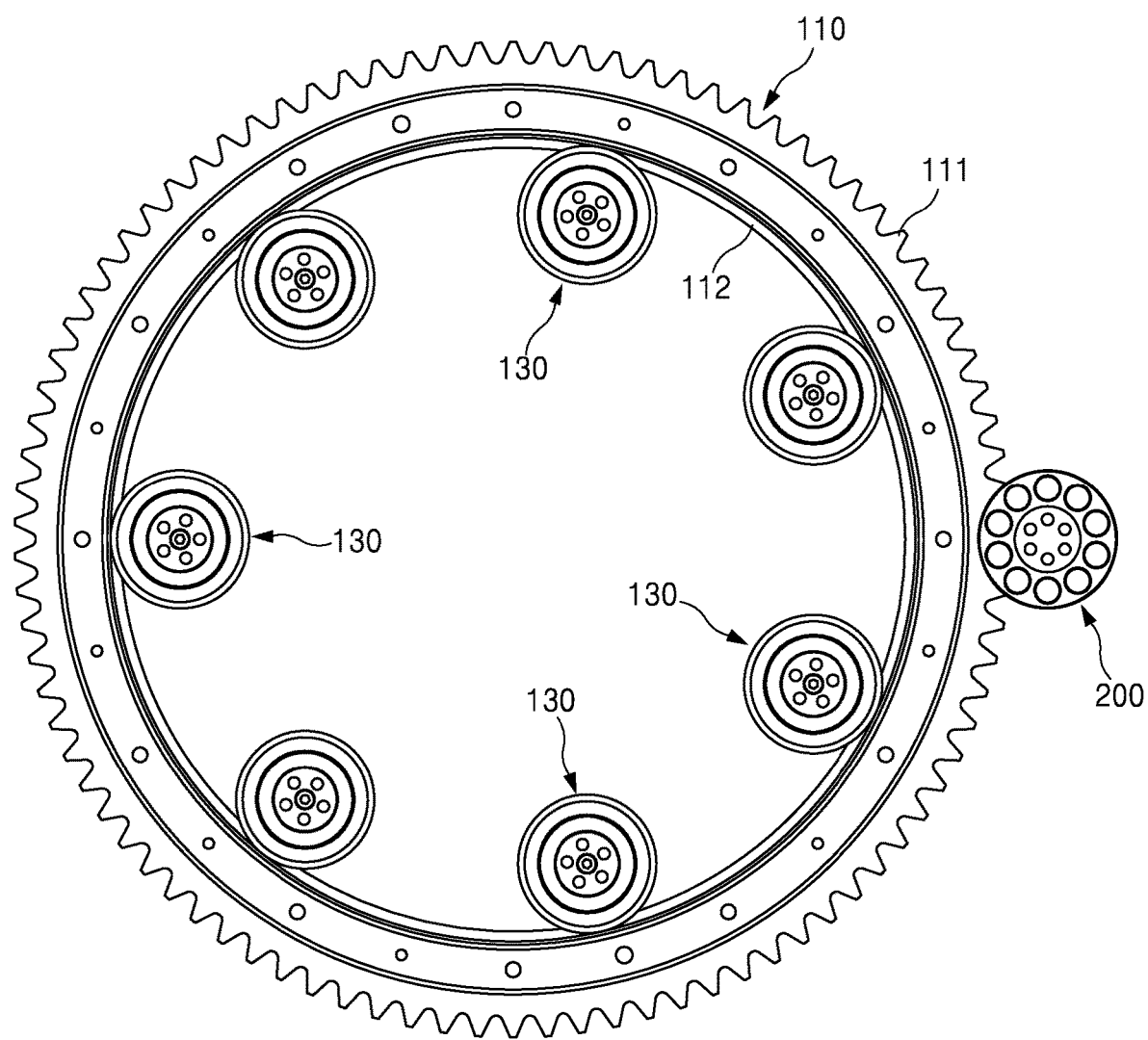
FIG. 9 is a plan view of FIG. 3 in which some module bearings are removed.
Figure 10:
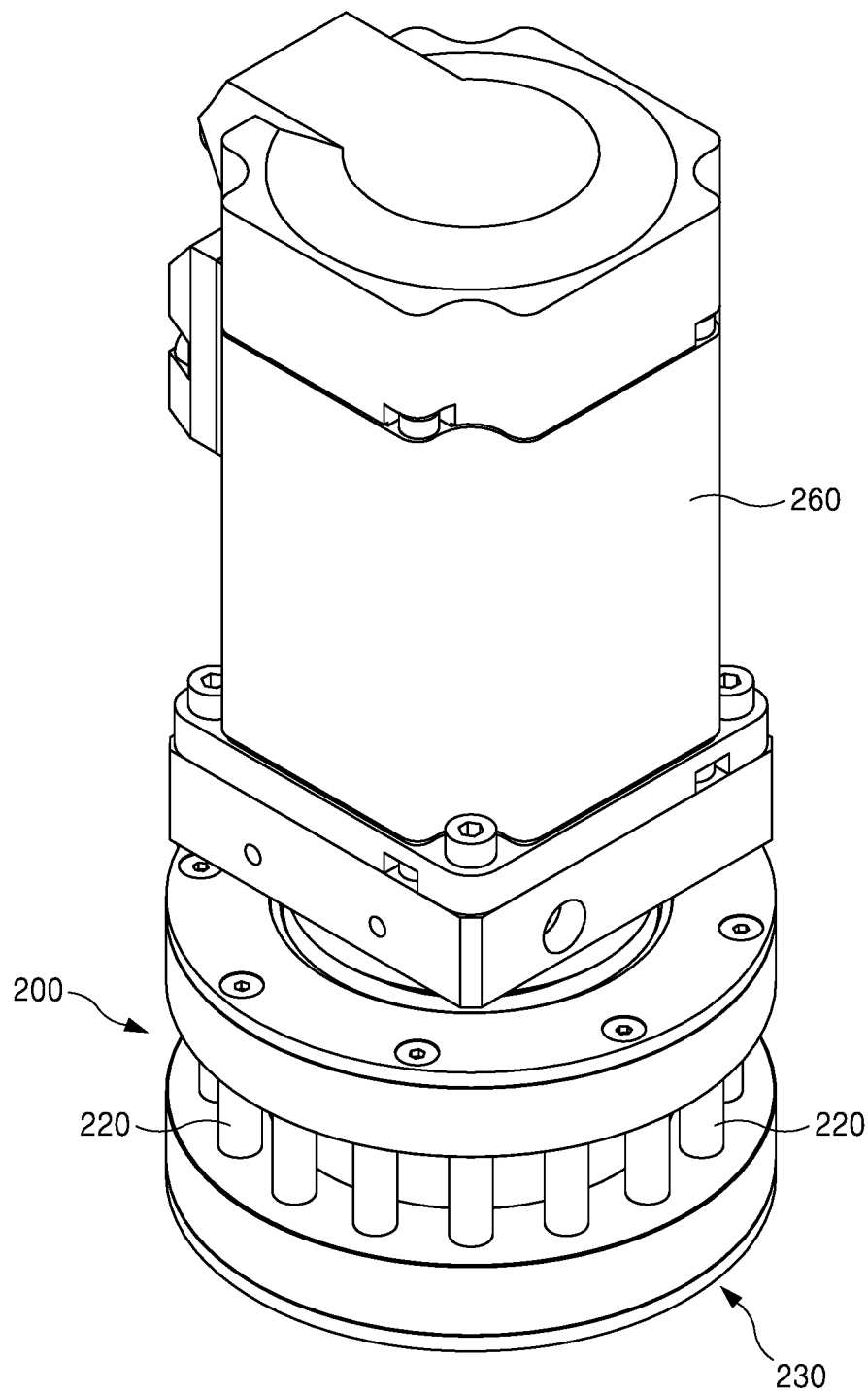
FIG. 10 illustrates a state in which a motor is coupled to a pinion illustrated in FIG. 3.

FIG. 3 is a perspective view of a power transmission device employing a module bearing, according to an embodiment of the present inventive concept. FIG. 4 is a partially cut-away perspective view of a major portion of FIG. 3. FIG. 5 is an enlarged view of an area A of FIG. 4. FIG. 6 is a partially cross-sectional view of FIG. 5. FIG. 7 is an enlarged view of a module bearing of FIG. 6. FIG. 8 is a partially exploded view of FIG. 7. FIG. 9 is a plan view of FIG. 3 in which some module bearings are removed. FIG. 10 illustrates a state in which a motor is coupled to a pinion illustrated in FIG. 3.

Referring to these drawings, a module bearing 130 according to the present embodiment is applicable to equipment without limitation of the size of a ring gear 110, may remarkably reduce installation costs by selectively using only a necessary number of the module bearings according to a load demanded by a process, and may enable thin and light implementation in an axial direction due to a compact structure.

Figure 11:
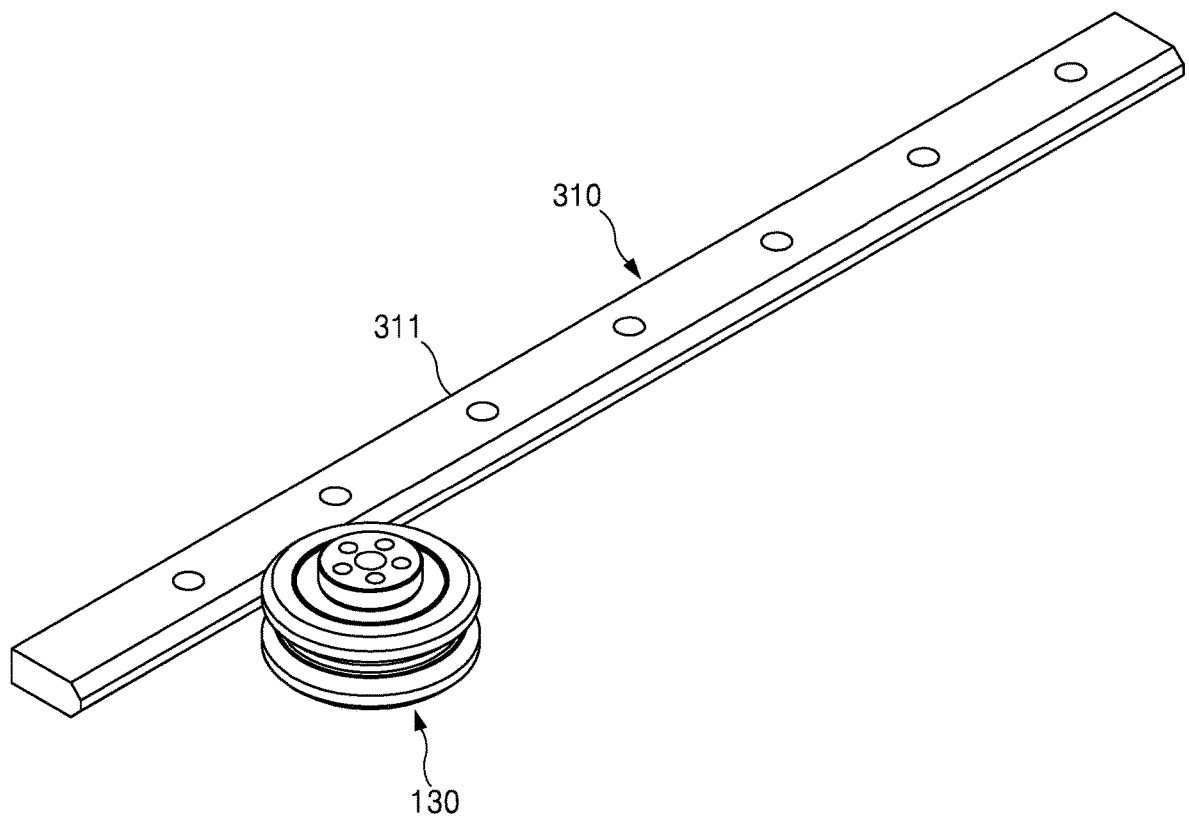
FIGS. 11 and 12 illustrate that a module bearing according to an embodiment is applied to a linear type gear.
Figure 12:
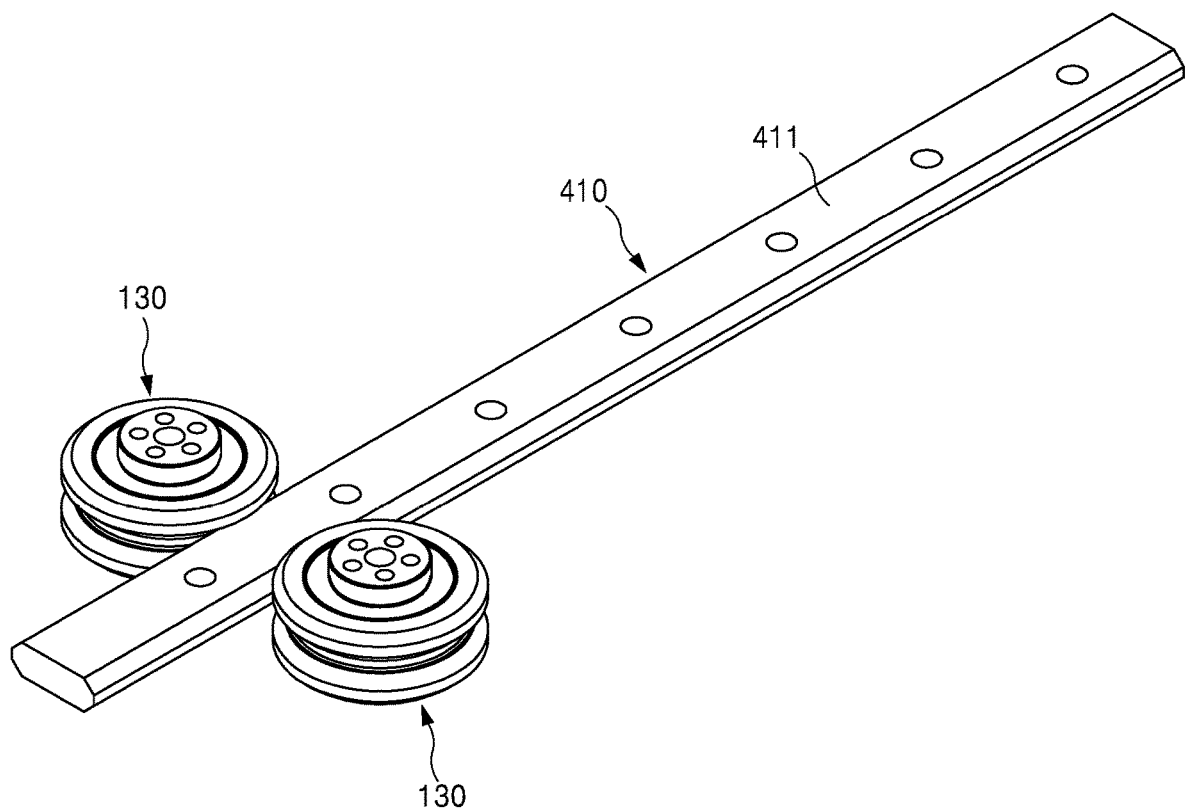
Figure 13:
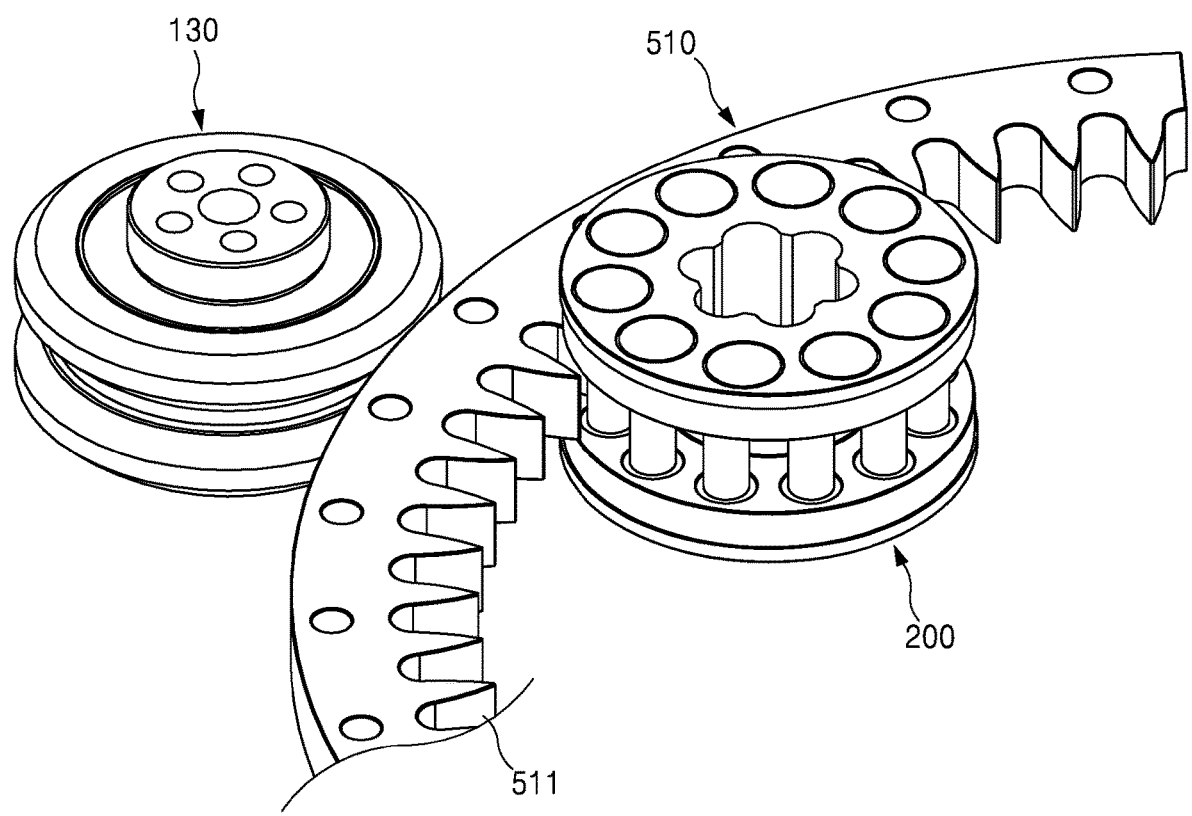
FIG. 13 illustrates that a module bearing according to an embodiment is applied to a curved type gear.

In particular, the module bearing 130 according to the present embodiment, which is applicable not only to the ring gear 110 of FIG. 3, but also to linear type gears 310 and 410 of FIGS. 11 and 12 or a curved type gear 510 of FIG. 13, is a new concept bearing capable of smoothly guiding linear motion and curved motion of the gears 310, 410, and 510.

In the present embodiment, a case in which the module bearing 130 is applied to the ring gear 110 is described. When the module bearing 130 according to the present embodiment is applied to the ring gear 110 of FIGS. 3, 4, and 9, as described above, equipment application may be possible without limitation of the size of the ring gear 110. In other words, even when the ring gear 110 is manufactured to be large, the module bearing 130 may be employed according to the size of the ring gear 110.

Furthermore, as illustrated in FIGS. 3 and 9, the module bearing 130 according to the present embodiment may remarkably reduce installation costs by selectively using only a necessary number of the module bearings 130 according to a load demanded by a process. For example, when a high load is needed, a relatively large number of the module bearings 130 may be applied to the ring gear 110 as illustrated in FIG. 3, and when a low load is needed than that of FIG. 3, the module bearing 130 may be used by removing some of the module bearings 130 of FIG. 3, as illustrated in FIG. 9.

Figure 2:
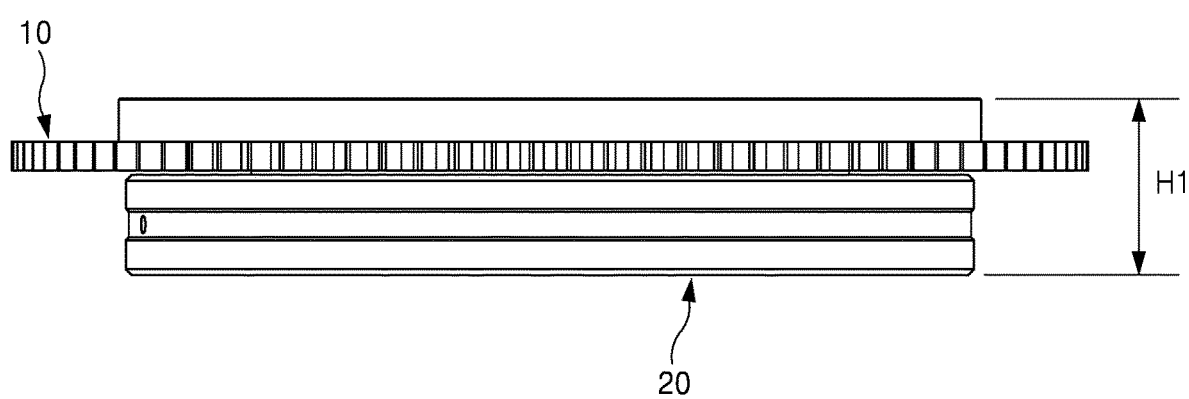
FIG. 2 is a side view of FIG. 1.

As such, since not only the number of the module bearings 130 according to the present embodiment is adjustable, but also the structure of the module bearing 130 is compact compared to the cross roller bearing 20 of FIGS. 1 and 2, the thin and light implementation in an axial direction may be possible. In other words, in the related art, a total height H1 increases due to the cross roller bearing 20 as illustrated in FIG. 2, and thus the thin and light implementation in an axial direction may not be easy. However, when the module bearing 130 according to the present embodiment is employed, a total height H2 may be reduced by the structural feature of the module bearing 130, as illustrated in FIG. 6, and thus the thin and light implementation in an axial direction may be possible.

The module bearing 130 having many merits as above may have, as illustrated in detail in FIGS. 5 to 8, a structure in which a part-assembly type module inner wheel 160 and a module outer wheel 140 are combined at the inner and outer sides with respect to a bearing rotor 150 interposed therebetween, and may inscribe the ring gear 110.

For reference, since the ring gear 110 applied to the present embodiment is a gear in which a tooth profile 111 is formed on an outer wall, the module bearing 130 may inscribe the ring gear 110.

However, a reverse case is sufficiently available. In other words, the tooth profile 111 may be formed on an inner wall of the ring gear 110 and the module bearing 130 may circumscribe the ring gear 110. In this case, a pinion 200 inscribes the ring gear 110 and may be used as a power source to rotate the ring gear 110.

In the structure of the module bearing 130, first, the module outer wheel 140, which is a rotating structure disposed at the outermost side in the module bearing 130 according to the present embodiment, is rotatably supported by and in contact with the ring gear 110. In other words, to guide a rotational motion of the ring gear 110, the module outer wheel 140 may be supported by and in contact with an inner wall of the ring gear 110.

As illustrated in detail in FIGS. 5 and 6, a guide protruding portion 112 is formed on an inner wall of the ring gear 110, and a guide slot 141 is formed to be concave in an outer wall of the module outer wheel 140 to stably guide the guide protruding portion 112 of the ring gear 110.

In this state, the guide slot 141 may have a letter V shape. Accordingly, the guide protruding portion 112 of the ring gear 110 is advantageous to be stably guided at a regular position in the guide slot 141. During the rotation of the ring gear 110, as the module outer wheel 140 is rotated by the operation of the bearing rotor 150, the rotational motion of the ring gear 110 may be supported.

Next, the bearing rotor 150 is a structure that is rotatably disposed radially inward of the module outer wheel 140. In other words, the bearing rotor 150 is a structure that freely rotates between the module outer wheel 140 and the part-assembly type module inner wheel 160. In the present embodiment, the bearing rotor 150 may be a ball.

The part-assembly type module inner wheel 160 is a structure arranged in the inner radial direction of the module outer wheel 140 with the bearing rotor 150 interposed therebetween, and is connected to the bearing rotor 150.

In the present embodiment, while the module outer wheel 140 is manufactured as an integrated structure, as a plurality of separate parts are manufactured and then assembled into the part-assembly type module inner wheel 160, the part-assembly type module inner wheel 160 is formed as one body.

As the part-assembly type module inner wheel 160 is manufactured in a plurality of separate parts and then the parts are assembled, when the module bearing 130 according to the present embodiment is actually used as illustrated in FIG. 3, a preload may be applied to the bearing rotor 150.

This is additionally described. Since the module bearing 130 according to the present embodiment is manufactured, as described above, in a structure in which the part-assembly type module inner wheel 160 and the module outer wheel 140 are coupled to each other at the inner and outer sides with the bearing rotor 150 interposed therebetween, a light inner gap may be generated in an area of the bearing rotor 150 due to a machining error or an assembly error.

When the module bearing 130 rotates with the slight inner gap, an axis is shaken, and thus rotation precision and location determination precision may be reduced. This needs to be compensated.

Accordingly, when the module bearing 130 is mounted and set on equipment as illustrated in FIG. 1, the above problem may be solved by applying a preload to the module bearing 130. In other words, as the inner gap that may be generated in the area of the bearing rotor 150 due to a machining error or an assembly error is previously used as minus (preloaded), generation of axis shaking may be prevented.

As such, when a preload is applied to the module bearing 130, even when the module bearing 130 according to the present embodiment receives a load, the generation of the inner gap may be difficult, and thus rigidity may be increased. Furthermore, when a preload is applied to the module bearing 130, a natural frequency of the axis increases to be suitable for a high-speed rotation, and furthermore axis shaking may be restricted and rotation precision and location determination precision may be increased.

When a preload is applied to the module bearing 130, vibration and noise may be restricted during the operation of the module bearing 130 according to the present embodiment.

An excessively high preload amount is not appropriate. When the preload amount is too great, shortened life span, abnormal heat generation, or increased rotational torque may incur, and thus it is better to follow a setting manual.

As described above, when the module bearing 130 according to the present embodiment is mounted and set on the equipment as shown in FIG. 1, to apply a preload to the module bearing 130, In the present embodiment, the part-assembly type module inner wheel 160 is separately manufactured into a plurality of parts, and then the part are coupled to each other forming one body.

The part-assembly type module inner wheel 160 may include a first inner wheel part 170 having a first support wall 171 supported by one end portion of the bearing rotor 150, and a second inner wheel part 180 having a second support wall 181 supported by the other end portion of the bearing rotor 150 at the opposite side of the bearing rotor 150.

In this state, the sizes of the first inner wheel part 170 and the second inner wheel part 180 may be different from each other. In the present embodiment, the second inner wheel part 180 having a size larger than that of the first inner wheel part 170 is applied, but an opposite case may be available. In some cases, the sizes of the first inner wheel part 170 and the second inner wheel part 180 may be identical to each other.

In the present embodiment, the part-assembly type module inner wheel 160 employ a combination of two parts, that is, the first inner wheel part 170 and the second inner wheel part 180. However, the part-assembly type module inner wheel 160 may be separately manufactured into three or more parts to be used by combing the parts.

In the first inner wheel part 170 having a relatively small volume, the first inner wheel part 170 may include a first inner wheel insertion portion 172 inserted into the inside of the bearing rotor 150, and a first inner wheel flange portion 173 connected to the first inner wheel insertion portion 172, having a diameter larger than the first inner wheel insertion portion 172, and forming the first support wall 171 between the first inner wheel insertion portion 172 and first inner wheel flange portion 173.

The second inner wheel part 180 has a substantially similar structure to the first inner wheel part 170, except a size. In other words, the second inner wheel part 180 may include a second inner wheel insertion portion 182 inserted into the inside of the bearing rotor 150 and surface-contacting an end portion of the first inner wheel insertion portion 172 inside the bearing rotor 150, and a second inner wheel flange portion 183 connected to the second inner wheel insertion portion 182, having a diameter greater than that of the second inner wheel insertion portion 182, and forming the second support wall 181 between the second inner wheel insertion portion 182 and second inner wheel flange portion 183.

In the above structure, first and second coupling bolt holes 174 and 184 and first and second preload bolt holes 175 and 185 are further formed in the part-assembly type module inner wheel 160. The first and second coupling bolt holes 174 and 184 may be provided singularly at a center of the part-assembly type module inner wheel 160, the first and second preload bolt holes 175 and 185 may be provided at several positions at an edge portion thereof, but not limited thereto.

The first and second coupling bolt holes 174 and 184 are holt holes respectively formed at the first inner wheel part 170 and the second inner wheel part 180 for fastening of a coupling bolt 190 to couple the first inner wheel part 170 and the second inner wheel part 180.

In the present embodiment, the first and second coupling bolt holes 174 and 184 are arranged singularly at a center area of the part-assembly type module inner wheel 160. However, when the size of the module bearing 130 is large, the first and second coupling bolt holes 174 and 184 may be plurality formed.

A manufacturer may supply the module bearing 130 to equipment manufacturers in a state in which the first inner wheel part 170 and the second inner wheel part 180 are coupled to each other by previously coupling the coupling bolt 190 to the first and second coupling bolt holes 174 and 184 as illustrated in FIG. 7.

The first and second preload bolt holes 175 and 185 are bolt holes respectively formed in the first inner wheel part 170 and the second inner wheel part 180 for fastening of a preload bolt (not shown) to apply a preload to the bearing rotor 150, after the first inner wheel part 170 and the second inner wheel part 180 are coupled to each other by the coupling bolt 190, as illustrated in FIG. 7.

In the present embodiment, a plurality of the first and second preload bolt holes 175 and 185 may be arranged in an equiangular interval along a circumferential direction of the coupling bolt 190. As described above, a manufacturer who manufactures the module bearing 130 may supply the module bearing 130 to equipment manufacturers in a state in which the first inner wheel part 170 and the second inner wheel part 180 are coupled to each other by previously coupling the coupling bolt 190 to the first and second coupling bolt holes 174 and 184 as illustrated in FIG. 7. In this state, the first and second preload bolt holes 175 and 185 are supplied in an empty state. When the module bearing 130 according to the present embodiment is mounted and set on the actual equipment as shown in FIG. 1, the first and second preload bolt holes 175 and 185 are used as a place for coupling a preload bolt by a setting operator.

In other words, since the first inner wheel part 170 and the second inner wheel part 180 of the part-assembly type module inner wheel 160 presses the bearing rotor 150 through the first support wall 171 and the second support wall 181, when the first inner wheel part 170 and the second inner wheel part 180 are further pressed by screwing the preload bolt, the inner gap that may be generated in the area of the bearing rotor 150 may be previously used as minus (preloaded). As described above, a clamping force of the preload bolt follows a setting manual.

As described above, when the module bearing 130 is applied to the ring gear 110 to guide the rotational motion of the ring gear 110, for example, as illustrated in FIG. 3 or 9, equipment application is available without limitation to the size of the ring gear 110. In other words, even when the ring gear 110 is manufactured to be large, the module bearing 130 may be applied suitable for the size of the ring gear 110.

Furthermore, since as illustrated in FIGS. 3 and 9, the module bearing 130 according to the present embodiment may remarkably reduce installation costs by selectively using only a necessary number of the module bearings 130 according to a load demanded by a process. For example, when a high load is needed, a relatively large number of the module bearings 130 may be applied to the ring gear 110 as illustrated in FIG. 3, and when a low load is needed than that of FIG. 3, the module bearing 130 may be used by removing some of the module bearings 130 of FIG. 3, as illustrated in FIG. 9.

Since the module bearings 130 according to the present embodiment has a much compact structure compared to the structure of the cross roller bearing 20 of FIGS. 1 and 2, the thin and light implementation in an axial direction may be possible. In other words, in the related art, the total height H1 is increased as illustrated in FIG. 2 due to the cross roller bearing 20, and thus the thin and light implementation in an axial direction is not easy. However, when the module bearing 130 according to the present embodiment is employed, the total height H2 may be reduced as illustrated in FIG. 6, and thus the thin and light implementation in an axial direction may be possible.

When the module bearing 130 is applied to the ring gear 110, for example, as illustrated in FIG. 3 or 9, a power source for rotating the ring gear 110 is needed. The pinion 200 may be used as a power source.

As described above, since the module bearing 130 inscribes the ring gear 110, the pinion 200 may circumscribe the ring gear 110.

However, the pinion 200 may inscribe the ring gear 110 and the module bearing 130 may circumscribe the ring gear 110.

The pinion 200 as a power source for rotating the ring gear 110 as above may be employed in various structures, which is briefly described in the following description with reference to FIG. 10.

Referring to FIG. 10, a pinion 200 may include a plurality of power transmission pins 220 having a circular arrangement structure and a pin rotation support portion 230 rotatably supporting the power transmission pins 220.

The power transmission pins 220 that are arranged corresponding to the tooth profile 111 of the ring gear 110 and rotate may allow the ring gear 110 to rotate.

The pin rotation support portion 230 is a structure to rotatably support the power transmission pins 220, and an external coupling type motor portion 260 for generating rotation power for rotating the pin rotation support portion 230 is connected to the pin rotation support portion 230. The external coupling type motor portion 260 may be a typical motor.

Accordingly, when the ring gear 110 is rotated as the pinion 200 is operated by the operation of the external coupling type motor portion 260, the module bearings 130 inscribing the ring gear 110 guide the rotational motion of the ring gear 110 so that a smooth rotational motion of the ring gear 110 may be guaranteed.

According to the present embodiment having the above described structure and operation, the application of the ring gear 110 is possible without limitation of the size of equipment. Also, the module bearing 130 according to the present embodiment may remarkably reduce installation costs by selectively using only a necessary number of the module bearings 130 according to a load demanded by a process. Also, the thin and light implementation in an axial direction is possible due to a compact structure. Furthermore, when a linear type gear (310 or 410, see FIGS. 11 and 12) or a curved type gear (510, see FIG. 13) is employed, linear motion and curved motion of the gear may be smoothly guided due to an efficient structure.

FIGS. 11 and 12 illustrate that a module bearing according to an embodiment is applied to a linear type gear. FIG. 13 illustrates that a module bearing according to an embodiment is applied to a curved type gear.

FIGS. 11 and 12 illustrate a case in which the module bearing 130 is applied to the linear type gears 310 and 410 to guide linear motion of the linear type gear 310. In this state, in FIG. 11, the module bearing 130 may be arranged only on one side wall of the linear type gear 310, and in FIG. 12, the module bearing 130 may be arranged on both side walls of the linear type gear 410.

For reference, although in FIGS. 11 and 12, for convenience of explanation, the pinion 200 (see FIG. 3) to allow the linear type gears 310 and 410 to have linear motion is omitted, in FIG. 11, a tooth profile (not shown) is formed on a side wall 311 of the linear type gear 310 at the opposite side of the module bearing 130 and the pinion 200 may be installed there, and in FIG. 12, a tooth profile (not shown) is formed on an upper wall 411 of the linear type gear 410 and the pinion 200 may be installed there.

FIG. 13 illustrates a case in which the module bearing 130 is applied to the curved type gear 510 to guide curved motion of the curved type gear 510. In this state, the pinion 200 is arranged at a portion where a tooth profile 511 and the module bearing 130 is arranged at the opposite position thereto to guide the curved motion of the curved type gear 510.

Figure 14:
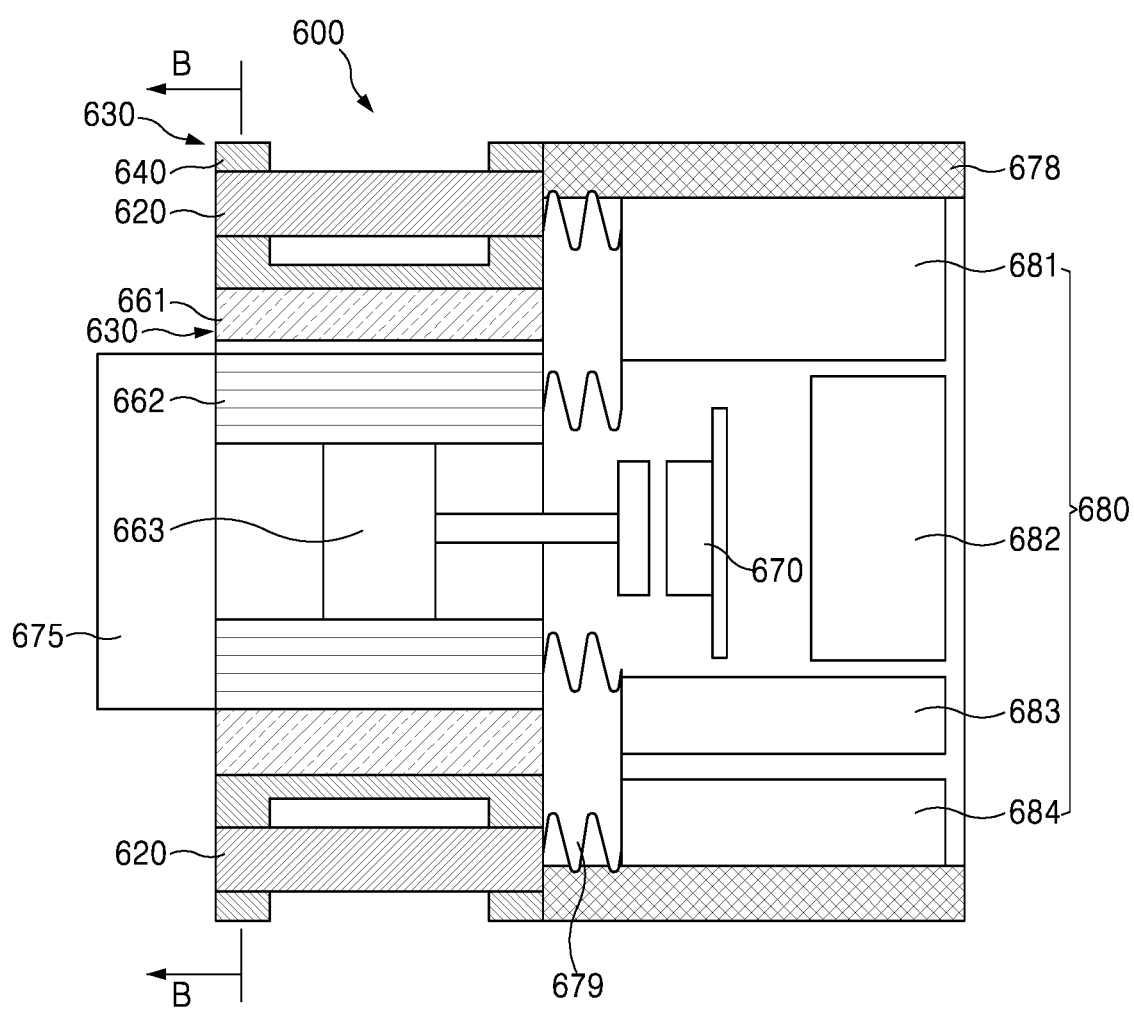
FIG. 14 is an internal structure view of a pinion as a modified example of a pinion.
Figure 15:
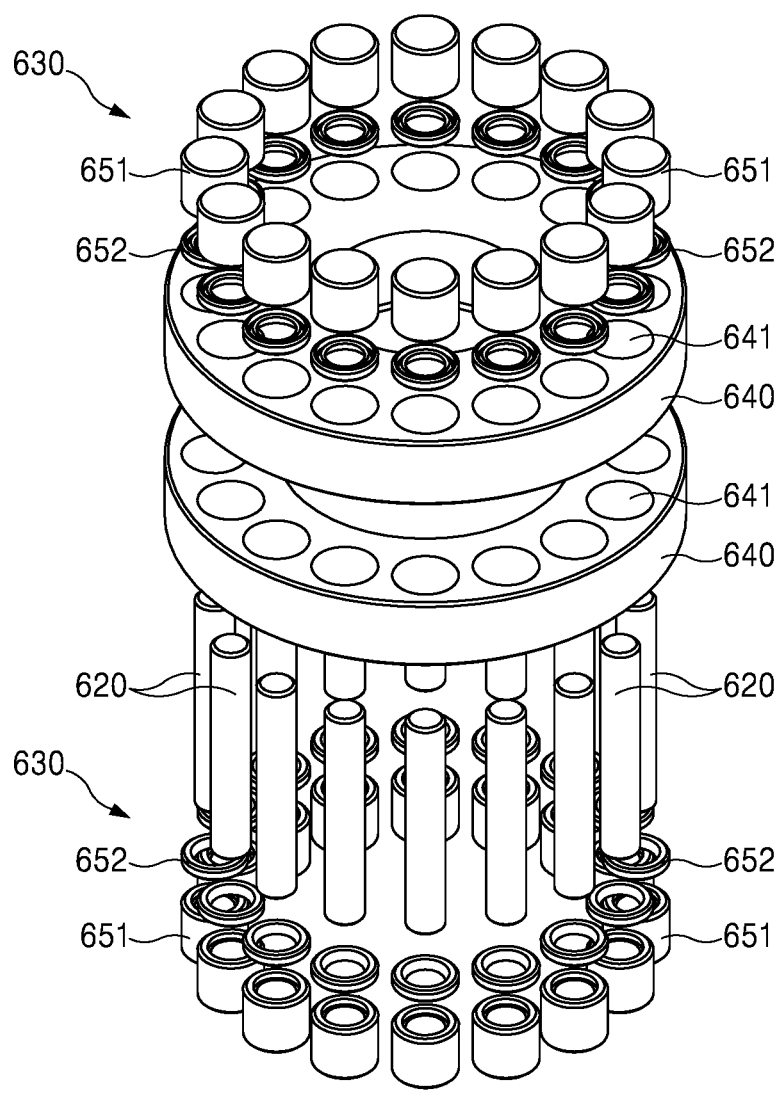
FIG. 15 is an exploded perspective view of a power transmission pin and a pin rotation support portion illustrated in FIG. 14.
Figure 16:
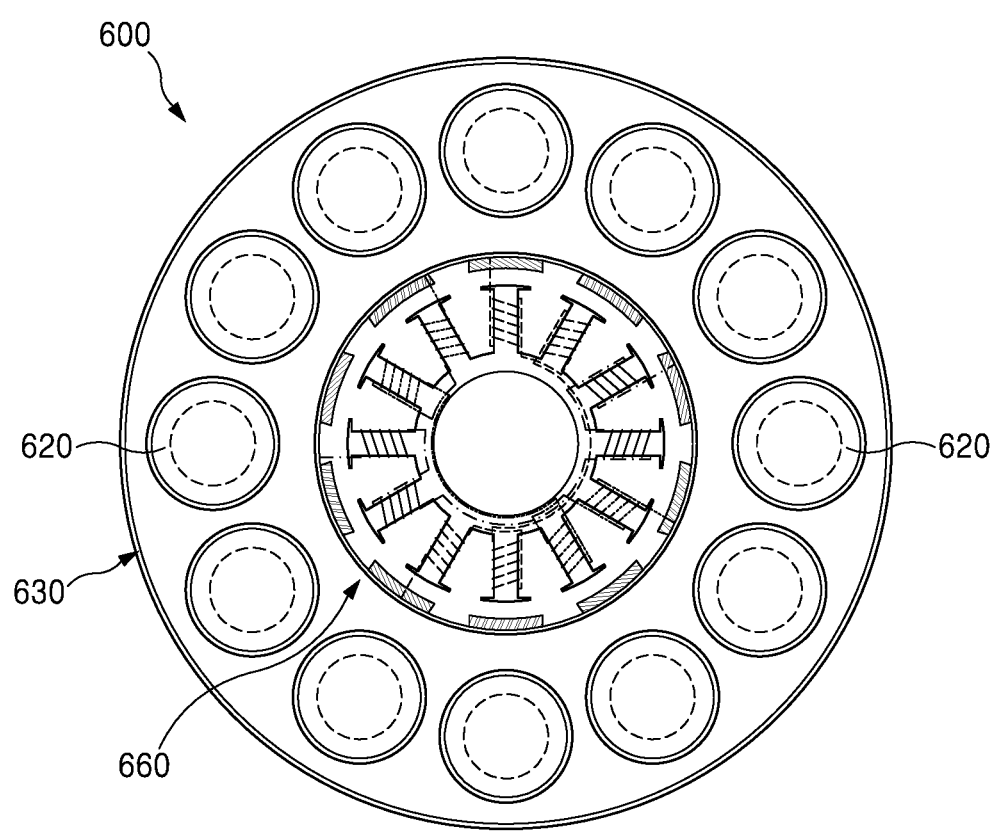
FIG. 16 is a cross-sectional view taken along line B-B of FIG. 14.
Figure 17:
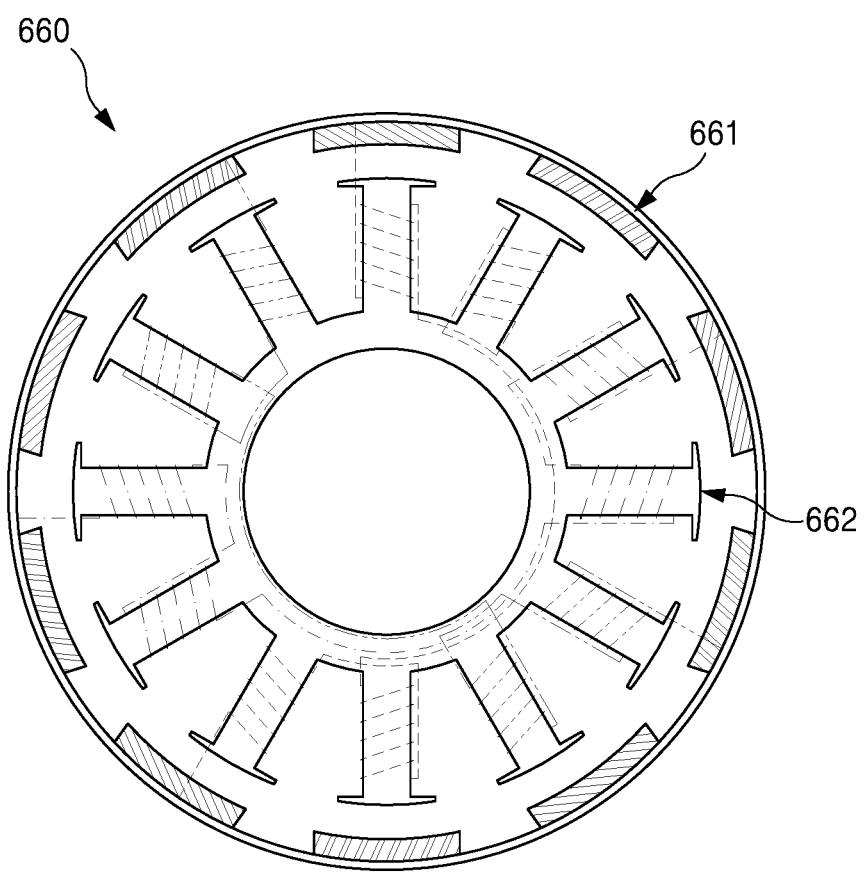
FIG. 17 is an enlarged view of an outer motor portion illustrated in FIG. 16.

FIG. 14 is an internal structure view of a pinion as a modified example of the pinion. FIG. 15 is an exploded perspective view of a power transmission pin and a pin rotation support portion illustrated in FIG. 14. FIG. 16 is a cross-sectional view taken along line B-B of FIG. 14. FIG. 17 is an enlarged view of an outer motor portion illustrated in FIG. 16.

The pinion 600 having a different shape of FIG. 10, that is, the pinion 600 illustrated in FIGS. 14 to 17 may be applied to the power transmission device according to the present embodiment.

Referring to FIGS. 14 to 17, the pinion 600 may include a plurality of power transmission pins 620 having a circular arrangement structure, and the pin rotation support portion 630 rotatably supporting the power transmission pins 620.

In the above structure, an outer motor portion 660 may be connected to the pinion 600. The outer motor portion 660 may be disposed radially inward of the pin rotation support portion 630 and may generate rotation power to rotate the pin rotation support portion 630.

The power transmission pins 620 are engaged with the tooth profile 111 of the ring gear 110 to interact with each other. The pin rotation support portion 630 that is a structure connected to the power transmission pins 620 having a circular arrangement structure rotatably supports the power transmission pins 620. The pin rotation support portion 630 may include a rotor connection body 640, a pin supporting bearing 651, and an oil seal 652.

The rotor connection body 640 rotatably supports the power transmission pins 620, and is a structure forming one body with a rotor 661. The rotor connection body 640 is arranged as a pair, one at each of both end portion regions of the power transmission pins 620. In other words, the rotor connection body 640 is provided as a pair parallelly by being spaced apart from each other by the length of the power transmission pins 620 or less. The pair of the rotor connection bodies 640 are connected to both end portions of the power transmission pins 620 and rotatably support the power transmission pins 620.

When the power transmission pins 620 are inserted into the rotor connection body 640, the power transmission pins 620 are supported by a plurality of pin insertion support holes 641 which are provided in an equiangular interval along the circumferential direction.

The pin supporting bearing 651 is arranged in an equiangular interval along the circumferential direction of the rotor connection body 640, as many as the number of the power transmission pins 620, and supports rotating motions of the power transmission pins 620. The pin supporting bearing 651 may be various rolling bearings having superior rigidity, including a ball bearing.

The oil seal 652 is provided one-to-one corresponding to the pin supporting bearing 651 and seals the pin insertion support holes 641 in the rotor connection body 640, in which the power transmission pins 620 are inserted and supported. In the present embodiment, since a pair of the rotor connection bodies 640 are employed, the pin supporting bearing 651 and the oil seal 652 are applied to each of the pair of the rotor connection bodies 640. In other words, the rotor connection body 640, the pin supporting bearing 651, and the oil seal 652 may have a symmetric structure with respect to the power transmission pins 620. Accordingly, an assembly task may be made easy.

The outer motor portion 660 is arranged in the inner radial direction of the pin rotation support portion 630 and connected to the pin rotation support portion 630, and generate rotation power to rotate the pin rotation support portion 630 that is externally arranged.

In other words, in the case of the power transmission device 600 according to the present embodiment, the outer motor portion 660 is arranged inside the pin rotation support portion 630 to rotate the pin rotation support portion 630 and the power transmission pins 620 that are structures arranged outside. In this case, a complex structure of directly connecting a separate motor as in the related art may be avoided and thus not only the total height of the device, but also an outer size thereof may be remarkably reduced.

The outer motor portion 660 is connected to the pin rotation support portion 630 in the inner radial direction of the pin rotation support portion 630, and includes the rotor 661 rotating with the pin rotation support portion 630 and a stator 662 that is fixedly disposed radially inward of the rotor 661 and rotates the rotor 661 by an applied current.

The rotor 661 is provided with a magnet, and the stator 662 is provided in a coil structure wound with a wire. Accordingly, when current flows in the stator 662, a magnetic force is generate by the Fleming's law, and when the current is alternately applied, the magnet of the rotor 661 is rotated according to the induced magnetic polarity.

In this state, since the rotor connection body 640 is coupled to the rotor 661, as the rotor 661 rotates, the rotor connection body 640 rotates as well, and thus the power transmission pins 620 may be guided to rotate.

A fixed shaft 663 is provided inside the stator 662. Unlike the rotor 661 that is rotatable, the fixed shaft 663 is not rotated and is fixed. Accordingly, a sensor such as an absolute position detection sensor 670 may be provided on the fixed shaft 663. In the present embodiment, the absolute position detection sensor 670 is coupled to an end portion of the fixed shaft 663 and detects the absolute positions of the power transmission pins 620. For example, when the absolute positions are misaligned, a control such as a forced stop of the operation of the outer motor portion 660 may be performed.

A closing cap 675 for protecting the outer motor portion 660 is provided around the outer motor portion 660. The closing cap 675 may protect the outer motor portion 660, and when the closing cap 675 is open, a path for maintenance and repair of the outer motor portion 660 may be formed.

A heat sink 678 for dissipating heat generated from the outer motor portion 660 is provided around the power transmission pins 620 at the opposite side of the closing cap 675.

The heat sink 678 may have a housing structure, in which various control circuits 680 for controlling the power transmission device 600 according to the present embodiment are provided. The control circuits 680 may include a power circuit 681, a wireless communication circuit 682, a MCU circuit 683, and an outer motor portion driving circuit 684.

An airflow space portion 679 for an airflow is formed in the heat sink 678 between the outer motor portion 660 and the control circuits 680. The airflow space portion 679 may prevent the control circuits 680 from being damaged as the heat generated from the outer motor portion 660 is directly transferred to the control circuits 680.

The above-described structure of the pinion 600 of FIGS. 14 to 17 may provide the effect of the present inventive concept.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

INDUSTRIAL APPLICABILITY

The present inventive concept may be used for various machine tools requiring a rotational motion or linear motion, industrial machine, semiconductor or flat display manufacturing equipment, and various logistics transfer facilities.

The invention claimed is:

1. A module bearing comprising:
a module outer wheel supported by and in contact with a side wall of a gear to guide rotational or linear motion of the gear;
a bearing rotor rotatably disposed radially inward of the module outer wheel; and a part-assembly type module inner wheel disposed radially inward of the module outer wheel with the bearing rotor interposed therebetween and connected to the bearing rotor, wherein a plurality of separate parts are manufactured and assembled into the part-assembly type module inner wheel to apply a preload to the bearing rotor,
wherein the part-assembly type module inner wheel comprises:
a first inner wheel part having a first support wall supported by one end portion of the bearing rotor; and
a second inner wheel part having a second support wall supported by the other end portion of the bearing rotor at an opposite side of the bearing rotor.

2. The module bearing of claim 1, wherein the first inner wheel part comprises:
a first inner wheel insertion portion inserted into the bearing rotor; and
a first inner wheel flange portion connected to the first inner wheel insertion portion, having a diameter greater than a diameter of the first inner wheel insertion portion, and forming the first support wall between the first inner wheel insertion portion and the first inner wheel flange portion.

3. The module bearing of claim 2, wherein the second inner wheel part comprises:
a second inner wheel insertion portion inserted into the bearing rotor and surface-contacting an end portion of the first inner wheel insertion portion inside the bearing rotor; and
a second inner wheel flange portion connected to the second inner wheel insertion portion, having a diameter greater than a diameter of the second inner wheel insertion portion, and forming the second support wall between the second inner wheel insertion portion and the second inner wheel flange portion.

4. The module bearing of claim 1, wherein the part-assembly type module inner wheel further comprises first and second coupling bolt fastening bolt holes respectively formed in the first inner wheel part and the second inner wheel part for fastening of a coupling bolt to couple the first inner wheel part and the second inner wheel part.

5. The module bearing of claim 4, wherein the first and second coupling bolt fastening bolt hole is disposed at a center area of the part-assembly type module inner wheel.

6. The module bearing of claim 1, wherein the part-assembly type module inner wheel further comprises first and second preload bolt fastening bolt holes respectively formed in the first inner wheel part and the second inner wheel part for fastening of a preload bolt to apply a preload to the bearing rotor after the first inner wheel part and the second inner wheel part are coupled to each other.

7. The module bearing of claim 6, wherein a plurality of first and second preload bolt fastening bolt holes are arranged in an equiangular interval along a circumferential direction of the part-assembly type module inner wheel.

8. The module bearing of claim 1, wherein sizes of the first inner wheel part and the second inner wheel parts are different from each other.

9. The module bearing of claim 1, wherein a guide slot in which a guide protruding portion of the gear is inserted and guided is formed to be concave in an outer wall of the module outer wheel.

10. The module bearing of claim 9, wherein the guide slot has a letter V shape.

11. The module bearing of claim 1, wherein the gear comprises any one of a ring gear, a linear type gear, and a curved type gear.

12. A power transmission device comprising:
a gear having a tooth profile formed on one side thereof;
a pinion engaged with the tooth profile of the gear to interact with each other; and
a plurality of module bearings arranged spaced apart from each other at an opposite side of a side portion where the tooth profile of the gear is formed, and guiding rotational or linear motion of the gear during driving of the pinion,
wherein each of the plurality of module bearings comprises:
a module outer wheel supported by and in contact with a side portion opposite to the side portion where the tooth profile of the gear is formed;
a bearing rotor rotatably disposed radially inward of the module outer wheel; and
a part-assembly type module inner wheel disposed radially inward of the module outer wheel with the bearing rotor interposed therebetween and connected to the bearing rotor, wherein a plurality of separate parts are manufactured and assembled into the part-assembly type module inner wheel to apply a preload to the bearing rotor;
wherein the part-assembly type module inner wheel comprises:
a first inner wheel part having a first support wall supported by one end portion of the bearing rotor; and
a second inner wheel part having a second support wall supported by the other end portion of the bearing rotor at an opposite side of the bearing rotor.

13. The power transmission device of claim 10, wherein the first inner wheel part comprises:

a first inner wheel insertion portion inserted into the bearing rotor; and a first inner wheel flange portion connected to the first inner wheel insertion portion, having a diameter greater than a diameter of the first inner wheel insertion portion, and forming the first support wall between the first inner wheel insertion portion and the first inner wheel flange portion, and the second inner wheel part comprises:

a second inner wheel insertion portion inserted into the bearing rotor and surface-contacting an end portion of the first inner wheel insertion portion inside the bearing rotor; and a second inner wheel flange portion connected to the second inner wheel insertion portion, having a diameter greater than a diameter of the second inner wheel insertion portion, and forming the second support wall between the second inner wheel insertion portion and the second inner wheel flange portion.

14. The power transmission device of claim 10, wherein the part-assembly type module inner wheel further comprises first and second coupling bolt fastening bolt holes respectively formed in the first inner wheel part and the second inner wheel part for fastening of a coupling bolt to couple the first inner wheel part and the second inner wheel part.

15. The power transmission device of claim 10, wherein the part-assembly type module inner wheel further comprises first and second preload bolt fastening bolt holes respectively formed in the first inner wheel part and the second inner wheel part for fastening of a preload bolt to apply a preload to the bearing rotor after the first inner wheel part and the second inner wheel part are coupled to each other.

16. The power transmission device of claim 12, wherein the pinion comprises:

a plurality of power transmission pins having a circular arrangement structure and engaged with the tooth profile of the gear; and a pin rotation support portion rotatably supporting the plurality of power transmission pins.

17. The power transmission device of claim 16, further comprising an external coupling type motor portion connected to the pin rotation support portion and generating rotation power to rotate the pin rotation support portion.

18. The power transmission device of claim 16, further comprising an outer motor portion arranged radially inward of the pin rotation support portion and connected to the pin rotation support portion, and generating rotation power to rotate the pin rotation support portion.

19. The power transmission device of claim 12, wherein the gear comprises any one of a ring gear, a linear type gear, and a curved type gear.

* * * * *